Jan. 25, 1944.  J. T. OBECNY  2,339,799
HYDRAULIC WORK HOLDER
Filed Aug. 28, 1940  3 Sheets-Sheet 1

INVENTOR.
John T. Obecny,
BY
ATTORNEY.

Jan. 25, 1  J. T. OBECNY  2,339,799
HYDRAULIC WORK HOLDER
Filed Aug. 28, 1940  3 Sheets-Sheet 2

INVENTOR.
John T. Obecny
BY
ATTORNEY.

Jan. 25, 1944.  J. T. OBECNY  2,339,799
HYDRAULIC WORK HOLDER
Filed Aug. 28, 1940  3 Sheets-Sheet 3
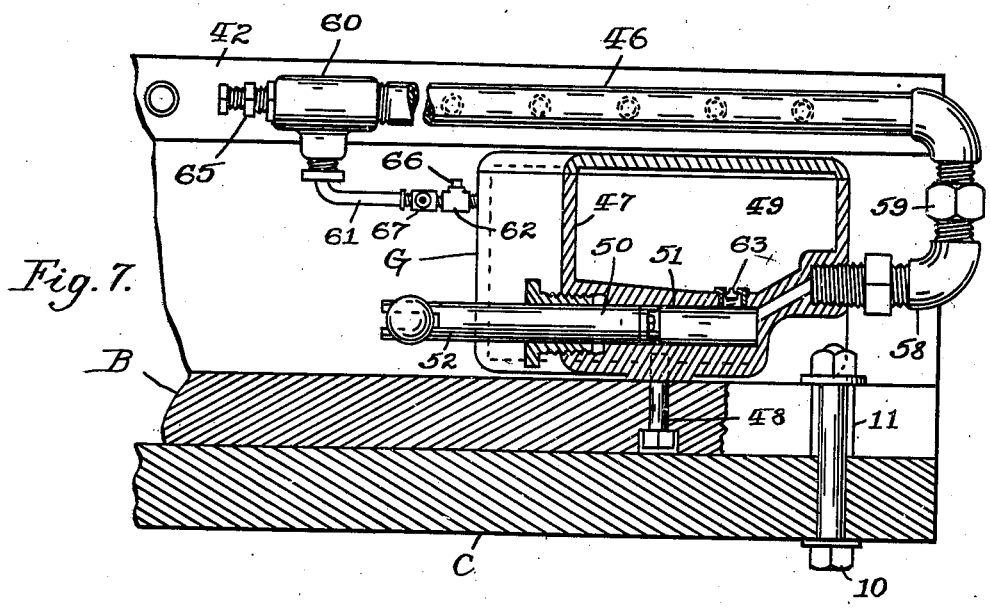
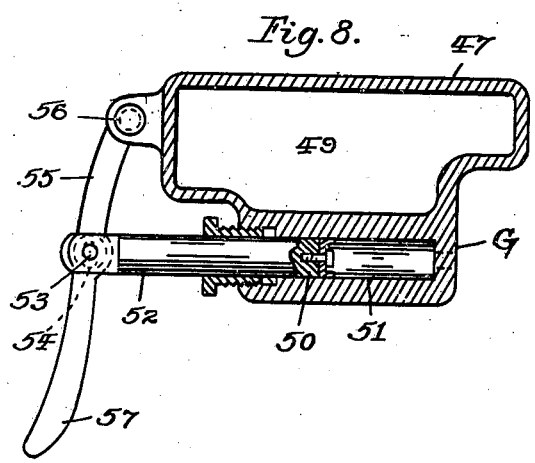
INVENTOR.
John T. Obecny,
BY
ATTORNEY.

Patented Jan. 25, 1944

2,339,799

UNITED STATES PATENT OFFICE 2,339,799

HYDRAULIC WORK HOLDER

John T. Obecny, Inglewood, Calif., assignor of one-half to Morrison C. Garst, Beverly Hills, Calif.

Application August 28, 1940, Serial No. 354,597

6 Claims. (Cl. 90—59)

My invention relates to hydraulic work holders for gripping and sustaining articles to be fabricated, machined, altered, marked or otherwise worked on in any manner. More particularly the invention provides among other features fluid actuated means for gripping and holding an article, or a plurality of articles, simultaneously in position in a machine tool and convenient for the operator, whereby the article or articles are held so that surface locations thereon are presented in an effective manner. The invention is particularly useful in machine shops, repair shops, manufacturing plants and in or on any place or location that may be engaged in doing mechanical work and in holding any articles as above stated.

The primary object of my invention is to provide a device of the character stated for holding any articles, for the purpose of machining, or conducting any operations during manufacture, with greater facility, speed, security and accuracy.

Another object is the elimination of fatigue, and time lost by the operator of machine tools in holding wrenches, and equipment for holding, unloading, tightening and securing parts, in fixtures, jigs and devices now in common use.

Another object of the invention is to provide an apparatus of its kind which can be incorporated into or made to readily function with machine tools of various kinds, such as milling machines, shapers, planers, jigs, drill presses, etc.

A still further object is to firmly hold a plurality or gang of articles securely in a machine tool to permit accurate mechanical operation thereon, such as milling, cutting, planing, grinding, polishing, boring, etc., and to simultaneously apply or release the holding means, thereby most effectively facilitating the use of the device, increasing speed, accuracy, longer fixture and tool life, and reducing cost of operation, danger and fatigue on the part of the operator.

Figure 1:
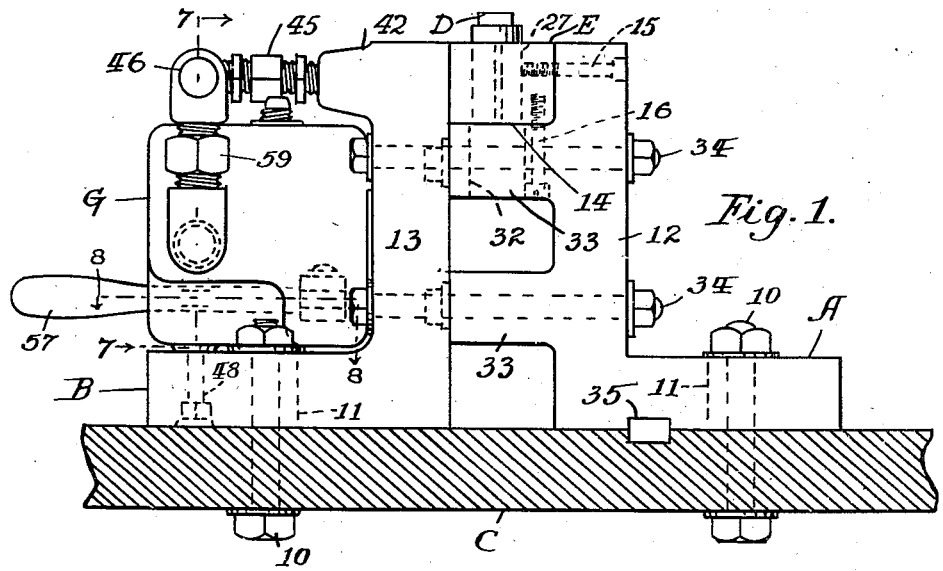
Figure 2:
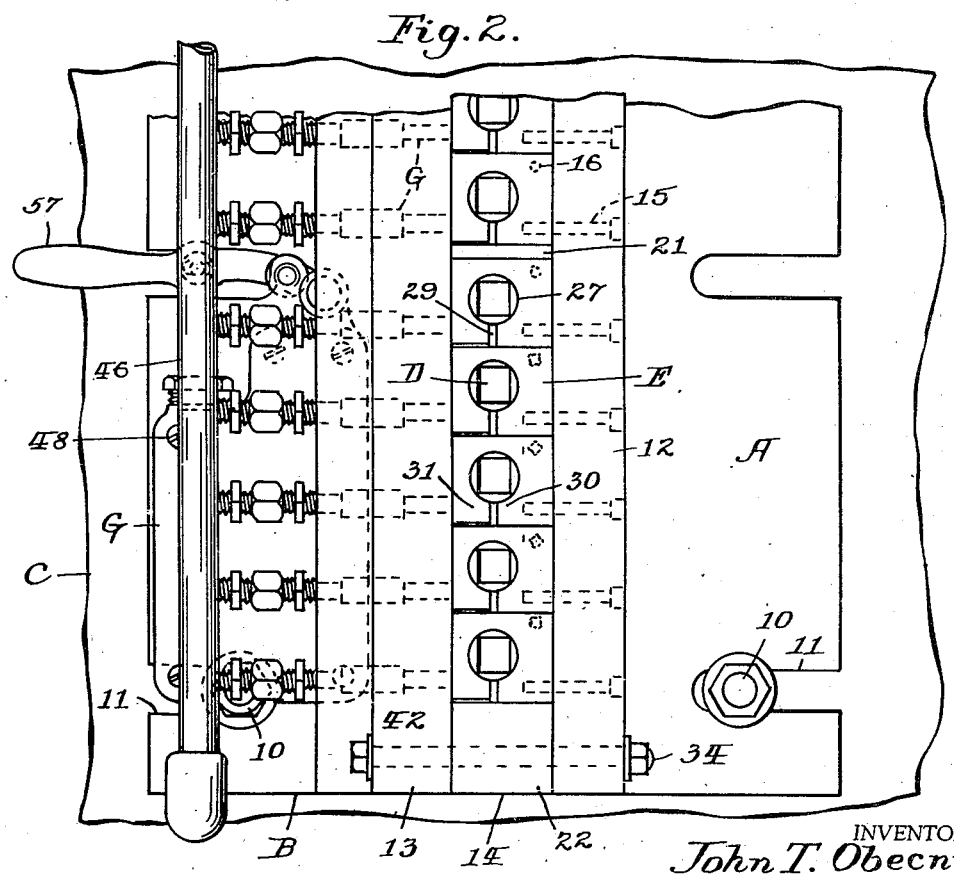
Figure 3:
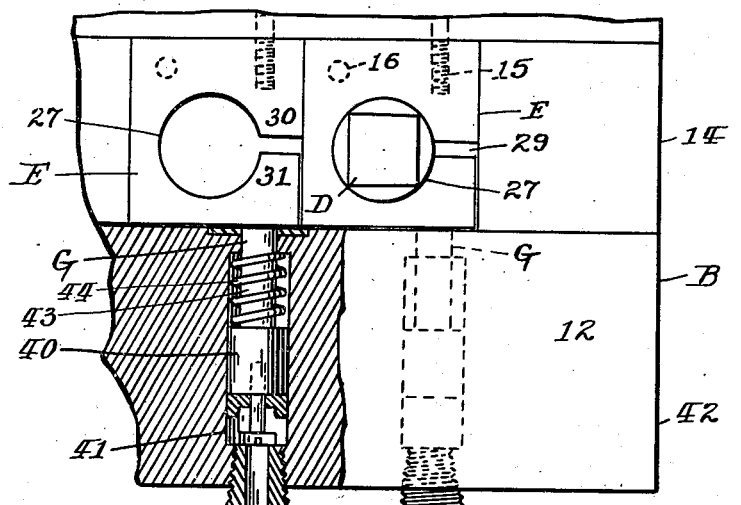
Figure 4:
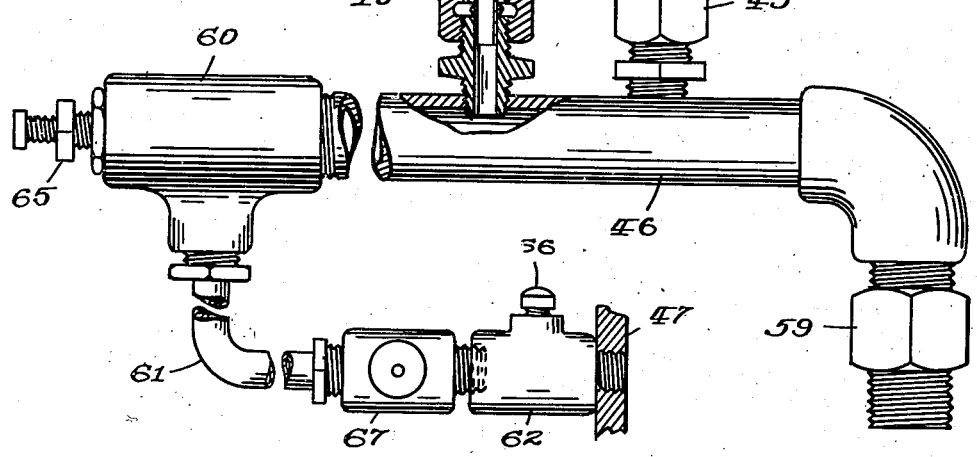
Figure 4:
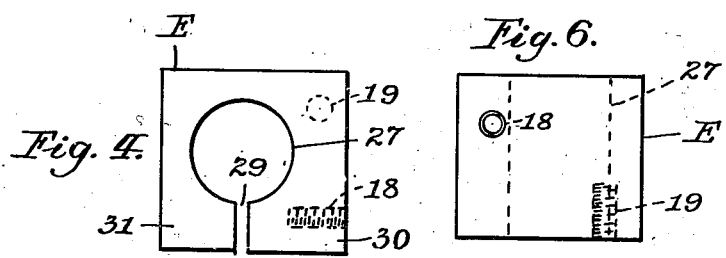
Figure 6:
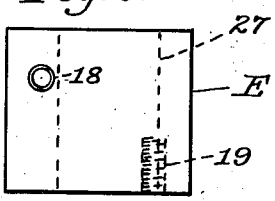
Figure 5:
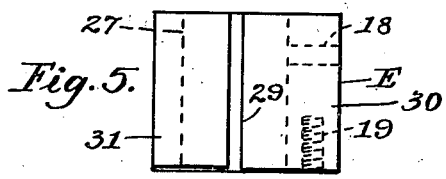

In the accompanying drawings forming part of this specification, Fig. 1 is an end elevation of my invention, shown mounted upon a portion of the bed plate of a machine tool; Fig. 2 is a plan of the structure shown in Fig. 1; Fig. 3 is a plan of a detail, partly in section, on an enlarged scale, illustrating the application of the fluid thrust elements to the work holding collet blocks and the compression fuel manifold; Fig. 4 is a plan of one of the collet blocks; Fig. 5 is a side elevation looking at the split ends of the collet block; Fig. 6 is a side elevation looking at another side of the collet block shown in Fig. 4;

Fig. 7 is a section taken on the line 7—7 of Fig. 1, part of the base of the angle plate being broken away; and Fig. 8 is another section taken on line 8—8 of Fig. 1.

My improved work holder as illustrated in the drawings employs two angle members A and B, which are adapted to be clamped in juxtaposition by bolt and slot connections 10 and 11 to the bed or table or other suitable support such as C, of a machine tool with which the device is adapted to cooperate. The angle member A as shown contains the mechanism which clamps the articles constituting the work with their surface locations presented in operative position to be worked on. The angle member B contains the fluid actuating mechanism for operating the work holding means in plate A. Each of the angle members has an inwardly facing vertical side, the member A having vertical face plate 12 and the member B face plate 13. The upper end of the face plate 12 is formed with an inwardly facing horizontal ledge 14 upon which are detachably secured by suitable means, such as screws 15 and 16, through screw receiving holes 18 and 19 (see Figs. 4, 5 and 6), a longitudinal row of any suitable number of vertical collet blocks E. The row of collet blocks may when desired be suitably divided by a spacer 21 (see Fig. 2). A retaining block, such as 22, may also, when desired be placed at the end of the row of collet blocks to assist in supporting the latter in operative position on the supporting ledge. Each collet block is formed with a vertical article receiving passage 27 of any suitable cross sectional shape to form a contractible collar thereon. One of the side walls of the collet block is split vertically at 29, to provide a pair of rigid and resilient jaws 30 and 31, the latter being positioned between the face plates 12 and 13. The article D representing the work is adjusted in the collar formed by the collet block with its surface locations presented to be worked on. The resilient jaw of the collar is adapted to be depressed, thus holding the inserted end of the work article rigidly in place in the machine tool so that the article can be machined or worked with precision. The collet blocks are aligned on the ledge 14 of the face plate 12. By providing a rigid back jaw 30 and depressing the front jaw 31 to clamp and hold the work in place, all of the articles held by the gang of collet blocks thus provided are adapted to be sustained in the holder element in exact horizontal and longitudinal alignment which is a distinct advantage. The body of the ledge 14 is provided with a clearance passage 32 immediately below the work receiving passage 27 through the collet blocks and the face side 12 of the angle member A is formed with bosses such as 33, terminating forwardly in vertical alignment with the forward end of the superimposed ledge 14. The inner face 13 of the angle member B abuts against the inner ends of the boss elements 33 and in this position the face plates are clamped firmly together by any suitable means such as tie bolts 34. When desired the angle member A may be additionally secured to the table or base plate C, such as by keying at 35.

The work holder operating means which is included in the angle member B consists of a plurality of fluid actuated elements G, one thrust element assemblage being arranged to coordinate with the resilient jaw member of a companion work holder collet block E and all of the thrust elements being actuated by fluid pressure supplied by a single manually controlled compressor pump such as G, which is shown mounted upon said angle member B. Each thrust element G consists of a piston 40 (see Fig. 3) which is reciprocated in the cylindrical passage 41 in the head 42 of the face plate 13. The end of the piston 40 facing the companion collet block E is provided with a piston pin 43 whose end is adapted to press against the side of the free end of the resilient jaw 31 of the collet block to compress the latter. A helical expansion spring 44 causes the piston to recede when fluid pressure is released. The outer end of the cylinder containing the collet jaw actuator is connected by the union assembly 45 with a pressure fluid supply manifold 46 which is common to all of the thrust elements, said manifold being coupled to a suitable fluid compressor such as G. This compressor may be of any suitable construction, that shown consisting of a suitable casing 47, secured rigidly to the base of angle member B by any suitable means such as bolts 48, and containing a suitable compressed fluid reservoir 49 and a hydraulic pump piston 50 fitted and reciprocable in a corresponding cylindrical bore 51. The stem 52 of the piston 50 is connected by a pin and slot connection 53 and 54 to the median portion of an operating lever 55 by which the piston is manually reciprocable. The fulcrum end of the lever 55 is pivoted at 56 to the side of the compressor casing while the work end is shaped with a handle 57 by which the lever is actuated. The inner end of the pump cylinder is connected to the compressed fluid supply manifold 46 by the piping 58 which contains a check valve 59 to prevent return flow of the fluid.

The opposite end of the manifold has a T fitting 60, to one branch thereof a return duct 61 is connected to the compressed fluid reservoir chamber 47 through another T 62. An automatic check valve 63 between the innermost end of the compressor cylinder 51 and the compressed fluid reservoir chamber 49 is adapted to admit fluid supplied from chamber 49 into the pump cylinder ahead of the piston during the suction stroke of piston 50 and check any return flow into chamber 49 thus causing pressure to increase each complete stroke of the piston in the supply line to the collet block actuating plungers. A suitable bleeder valve 65 of ordinary construction is connected to the remaining branch of the fitting 60 by which any air locked in the system resulting from leakage is released. The T 62 has one of its branches normally closed by a removable filler plug 66 which, when removed, permits charging or replenishing the supply of compressor fluid into the reservoir 47. A suitable hand operable relief valve 67 is connected into the return duct 61 between the T couplings 60 and 62 by which the fluid pressure can be released and cause the pistons 40 to release all of the collets E simultaneously which hold the work in the device.

In use the angle members are secured to the bed or table of the machine tool or other support upon which the work is to be performed. The collet blocks with their openings therein suitable to receive and hold the articles to be machined or otherwise worked are secured in alignment upon the ledge 14 of member A by the fasteners 15 and 16 and the member B is secured to member A by the bolts 34 with their actuating thrust members in juxtaposition to abut against the sides of the resilient jaw members 31 of the collet blocks. The articles to be machined or otherwise worked are adjusted to the collet blocks and the pump after first being charged with suitable compressible fluid is then reciprocated until sufficient pressure is exerted against the pistons 40 to cause their thrust ends to compress the jaws upon the work and hold the articles firmly in the collet blocks in strict alignment to be accurately machined or otherwise worked by the machine tool in which the device is used. When the desired pressure is attained to hold the article firmly in the collet block, the pump is left at rest. When it is desired to release the work the bleeder valve 67 is opened, until the pressure of the compressed fluid is released sufficiently to cause the springs to release the resilient jaws of the collet blocks. In this position the work articles may be removed freely from the machine.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the spirit of the invention and within the scope of the following claims.

I claim:

1. In a gang work holder, a pair of juxtaposed separable sections, a chuck seating ledge on one section, a series of compressible chucks seated on said ledge, securing elements anchoring said chucks in position on the ledge, individual chuck compressor members carried by the other section in line with the chucks, and pressure means on said other section operative to actuate all said chuck compressor members in unison against the chucks.

2. In a gang work holder, a base, a pair of uprights adjustable thereon into juxtaposed relation, one upright having a planar face opposed to the other upright and said other upright having thereon a lateral ledge extending toward the planar face upright, a series of compressible chucks seated on said ledge, individual securing elements anchoring said chucks in position on the ledge, a series of plungers carried by said planar face upright and operable through its face above said ledge to contact the chucks thereon, and means for simultaneously operating all said plungers for uniform compression of the chucks.

3. A hydraulic work holder including in combination: a pair of juxtaposed body sections, one of said body sections having therein a series of openings to receive collets, a corresponding series of collets seated in said openings for holding work pieces, a series of pressure elements sustained in the other of said body sections hydraulically operable for compressing said collets upon work pieces therein, hydraulic means for simultaneously operating said pressure elements upon said collets, said hydraulic means being common to all of said pressure elements, whereby the pressure is equalized over all of said collets, and manually operable means for controlling said hydraulic means.

4. In a holder for a plurality of work pieces, the combination of a collet seating body, a plurality of collets seated upon said body, means for restraining displacement of the collets from their seats, each of said collets having a socket for receiving a work piece and a resilient contractible wall for embracing the corresponding work piece, a plunger adjacent to said wall of each collet along a line substantially transverse to the longitudinal axis of the collet, each collet and its corresponding plunger having engaging faces cooperating to contract the collet and clamp its corresponding work piece, and hydraulic means for advancing the plungers against the contractible walls of said collets.

5. In a holder for a plurality of work pieces, the combination of a collet seating body, a plurality of collets seated in said body, each of said collets having a socket for receiving a work piece and a resilient contractible wall for embracing the corresponding work piece, and said body and collets having cooperating means by which the collets are restrained from displacement and are sustained in substantially longitudinal alignment on the body with the axes of their sockets disposed substantially parallel, a plurality of plungers corresponding to said collets, each plunger being guided to move against the contractible wall of a collet, and each collet and its corresponding plunger having engaging faces cooperating to contract the collet and clamp the corresponding work piece, and actuating means for advancing the plungers in unison.

6. In a holder for a plurality of work pieces, the combination of a collet seating body, a plurality of split collets seated in said body, means for restraining displacement of the collets from their seats in said body, each of said collets having a socket for receiving a work piece and a forwardly disposed contractible jaw for engaging the corresponding work piece in the socket, an actuating element guided toward and against said jaw to contract the latter, each collet and its corresponding actuating element having engaging faces cooperating to contract said jaw and engage the corresponding work piece in the collet, and means for advancing the actuating element against the contractible jaws of said collets in unison.

JOHN T. OBECNY.